United States Patent [19]

Tasaka et al.

[11] Patent Number: 4,590,234

[45] Date of Patent: May 20, 1986

[54] MELT-MOLDABLE FLUORINE-CONTAINING RESIN COMPOSITION

[75] Inventors: Takeo Tasaka; Akiyoshi Kawaguchi; Yozaburo Tsujikawa, all of Tokushima, Japan

[73] Assignee: Otsuka Kagaku Kabushiki Kaisha, Osaka, Japan

[21] Appl. No.: 669,989

[22] Filed: Nov. 9, 1984

[30] Foreign Application Priority Data

Dec. 22, 1983 [JP] Japan ................................ 58-243147

[51] Int. Cl.$^4$ ............................................. C08K 3/10
[52] U.S. Cl. ..................................................... 524/413
[58] Field of Search ......................................... 524/413

[56] References Cited

U.S. PATENT DOCUMENTS 4,009,043 2/1977 Preis ..................................... 524/413

Primary Examiner—Paul R. Michl
Assistant Examiner—Alex H. Walker
Attorney, Agent, or Firm—Armstrong, Nikaido, Marmelstein & Kubovcik

[57] ABSTRACT

A fluorine-containing resin composition which comprises a potassium titanate fiber and at least one fluorine-containing resin selected from the group consisting of poly(chlorotrifluoroethylene), copolymer of tetrafluoroethylene and a copolymerizable monomer, chlorotrifluoroethylene-ethylene copolymer, tetrafluoroethylene-ethylene copolymer, polyvinylidene fluoride and copolymer of vinylidene fluoride and a copolymerizable monomer.

2 Claims, No Drawings

MELT-MOLDABLE FLUORINE-CONTAINING RESIN COMPOSITION

This invention relates to a melt-moldable fluorine-containing resin composition having excellent properties which comprises potassium titanate fiber without causing deterioration of the inherent property of the fluorine-containing resin.

The fluorine-containing resin is a synthetic high molecular compound which contains fluorine atom in the molecule. A typical resin is polytetrafluoroethylene. The fluorine-containing resin has excellent resistances to heat, chemicals and weather as well as non-tacking and low abrasion properties compared with other high molecular resins.

However, most of the fluorine-containing resins having high melting points must by necessity be highly increased in molecular weight to obtain practical excellent properties, rendering the resin very high in melt viscosity. Thus, it is quite difficult to subject the resin to melt molding when glass fiber, carbon fiber and like reinforcing fiber is added to the resin. Particularly, it is impossible to mold the above reinforced resin into parts having a very small thickness. Accordingly, the fluorine-containing resin is generally molded without reinforcing fiber into parts such as a valve, tool for preparing a semi-conductor and the like.

The following disadvantages are associated with the use of fluorine-containing resin unmodified with any additive.

1. Shrinkage is large on shaping.
2. The fluorine-containing resin is low in mechanical strength compared with other engineering plastics. Thus, it is necessary to mold the resin into mechanical parts having large thickness in despite of very expensive cost of the resin. Alternatively, the molded parts must be reinforced by use of a rib or the like, hence making the process uneconomical.
3. The fluorine-containing resin is excellent in heat resistance and usually can be used at a high temperature of 100° to 200° C., but is insufficient in creep resistance.
4. Although the resin has a small abrasion coefficient, abrasion resistance is low.

An object of the invention is to provide a fluorine-containing resin composition which can be molded into parts having a small shrinkage, excellent mechanical property and resistance to creep.

Another object of the invention is to provide a fluorine-containing resin composition which can be molded into complicated or small, thin-wall parts.

Still another object of the invention is to provide a fluorine-containing resin composition which gives a molded product having a very good appearance due to an excellent surface-smoothness and gloss.

The above and other objects of the invention will be apparent from the following description.

The present invention provides a fluorine-containing resin composition which comprises a potassium titanate fiber and at least one fluorine-containing resin selected from the group consisting of poly(chlorotrifluoroethylene), copolymer of tetrafluoroethylene and a copolymerizable monomer (a), chlorotrifluoroethylene-ethylene copolymer, tetrafluoroethylene-ethylene copolymer, polyvinylidene fluoride and copolymer of vinylidene fluoride and a copolymerizable monomer (b), the copolymerizable monomer (a) being selected from to group consisting of fluoro-olefin of the formula $$XCF_2(CF_2)_mCF{=}CF_2 \qquad (I),$$

fluorovinyl ether of the formula $$XCF_2(CF_2)_nOCF{=}CF_2 \qquad (II),$$

perfluoroalkyl vinyl ether of the formulae $$XCF_2(CF_2)_nOCFCF_2OCF{=}CF_2 \text{ and} \atop \phantom{XCF_2(CF_2)_nO}\overset{|}{CF_3} \qquad (III)$$

$$Y{-}CF_2CF_2OCFCF_2OCF{=}CF_2 \atop \phantom{Y{-}CF_2CF_2O}\overset{|}{CF_3} \qquad (IV)$$

perfluoroallyloxy compound of the formula $$CF_2{=}CCF_2O{-}\overset{\overset{D}{|}}{\underset{\underset{E}{|}}{C}}{-}G \atop \overset{|}{Z} \qquad (V)$$

wherein X is F or H, m is 0 to 9, n is 0 to 7, Y is Cl, $-SO_2F$, $-COF$, $-CO_2H$, $-CO_2R^1$, $-CF_2CO_2R^1$, $-(CF_2)xR^1$, $R^1$ being F or $CF_3$, x is 1 to 6, Z is Cl or F, D is $-CF_2R^2$ or $$-\overset{\overset{CFR^2,}{|}}{\underset{CF_3}{}}$$

$R^2$ being F, Cl, $-SO_2F$, $-COF$, $-CO_2H$, $-CO_2R^1$, $-CF_2CO_2R^1$ or $-(CF_2)xR^1$, E is F, $-CF_3$, $-CF_2CO_2R^1$ or $-CF_2Cl$, G is F or $-CF_3$, the copolymerizable monomer (b) being selected from the group consisting of tetrafluoroethylene, hexafluoropropylene, chlorotrifluoroethylene and vinyl fluoride, the potassium titanate fiber being contained in an amount of 5 to 40% (% by weight, same in hereinafter) based on the total amount of the fiber and the resin.

Examples of useful fluorine-containing resins are poly(chlorotrifluoroethylene) which is a homopolymer of chlorotrifluoroethylene, copolymers of tetrafluoroethylene (hereinafter referred to as "TFE") and a copolymerizable monomer, homopolymer of vinylidene fluoride, copolymers of vinylidene fluoride and a copolymerizable monomer, etc.

Typical examples of copolymers of TFE are as follows:

A copolymer of TFE and a fluoro-olefin of the formula $$XCF_2(CF_2)_mCF{=}CF_2 \qquad (I)$$

wherein X is F or H, m is 0 to 9. Examples of the flouro-olefins are hexafluoropropylene, perfluoropentene-1, etc. These fluoro-olefins are usually copolymerized in an amount of 5 to 30%. A typical example of the copolymer is TFE-hexafluoropropylene copolymer.

A copolymer of TFE and a fluorovinyl ether of the formula $$XCF_2(CF_2)_nOCF{=}CF_2 \qquad (II)$$

wherein X is same as above, n is 0 to 7. Examples of the ethers are perfluoroethyl perfluorovinyl ether, perfluoropropyl perfluorovinyl ether, etc.

A copolymer of TFE and a perfluoroalkyl vinyl ether, the ether being at least one compound selected from the group consisting of fluorovinyl polyether of the formula (III) and the isomers thereof of the formula (IV)

$$XCF_2(CF_2)_nO\overset{\underset{\displaystyle CF_3}{|}}{C}FCF_2OCF=CF_2 \quad \text{(III)}$$

wherein X and n are same as above, $$Y-CF_2CF_2O\overset{\underset{\displaystyle CF_3}{|}}{C}FCF_2OCF=CF_2 \quad \text{(IV)}$$

wherein Y is Cl, $-SO_2F$, $-COF$, $-CO_2H$, $-CO_2R^1$, $-CF_2CO_2R^1$, $-(CF_2)xR^1$, $R^1$ being F or $CF_3$, x is 1 to 6. These ethers (III) and (IV) are usually copolymerized in an amount of several %

A copolymer of TFE and a polyfluoroallyloxy compound of the formula $$CF_2=C\overset{\underset{\displaystyle Z}{|}}{C}F_2O-\overset{\underset{\displaystyle E}{|}}{\overset{\displaystyle D}{\underset{|}{C}}}-G \quad \text{(V)}$$

wherein Z is Cl or F, D is $-CF_2R^2$ or $$-\overset{\underset{\displaystyle CF_3}{|}}{C}FR^2,$$

$R^2$ being F, Cl, $-SO_2F$, $-COF$, $-CO_2H$, $-CO_2R^1$, $-CF_2CO_2R^1$ or $-(CF_2)xR^1$, $R^1$ and x are same as above, E is F, $-CF_3$, $-CF_2CO_2R^1$ or $-CF_2Cl$, G is F or $-CF_3$. Examples of the compounds are perfluoro-3-(butoxy)propene, 1-(1,1,1,2,3,3-hexafluoro-3-chloro-2-propoxy)pentafluoro-2-propene, etc. These compounds are usually copolymerized in an amount of about 0.1 to 55%, preferably 1 to 10%.

A copolymer of TFE or chlorotrifluoroethylene and 35 to 65 mole % of ethylene.

The vinylidene fluoride copolymer contains preferably at least 90 mole % of vinylidene fluoride. Examples of useful monomers which are copolymerizable with vinylidene fluoride are TFE, hexafluoropropylene, chlorotrifluoroethylene, vinyl fluoride, etc.

A homopolymer and copolymer of vinylidene fluoride (hereinafter referred to as "vinylidene fluoride resin") have a polymerization degree which is indicated in terms of intrinsic viscosity η inh of about 0.5 to 2.0, preferably 0.8 to 1.5.

η inh is represented by the following equation.

$$\eta_{inh} = \frac{1}{c} \ln\left[\frac{\eta}{\eta_0}\right]$$

wherein c is the concentration of the polymer in dimethylformamide (0.4 g/dl), η is the viscosity of the polymer in dimethylformamide and η0 is the viscosity of dimethylformamide, each measured at 30° C.

With η inh of less than 0.5, the vinylidene fluoride resin is poor in mechanical property. While with η inh of more than 2.0, moldability of the resin becomes poor due to a high melt viscosity, hence it is undesirable.

These fluorine-containing resins can be used which are prepared in any method such as suspension polymerization, emulsion polymerization, solution polymerization or bulk polymerization. These resins may be used in mixture of at least two of them according to a contemplated purpose.

The fluorine-containing resin has a number average molecular weight of preferably $10^5$ to $10^7$ and more preferably $10^5$ to $10^6$.

The potassium titanate fiber used in the invention is a single crystal represented by the formula $$K_2O.l(TiO_2)$$

or $$K_2O.l(TiO_2).\tfrac{1}{2}H_2O$$

wherein l is an integer of 2 to 8. Examples thereof are potassium tetratitanate fiber, potassium hexatitanate fiber, potassium octatitanate fiber, etc., and these are used singly or in mixture. The titanate fiber has an average fiber diameter of preferably 0.1 to 2 μm, average fiber length of preferably 5 to 100 μm and a ratio of average fiber length to average fiber diameter (aspect ratio) of preferably 10 to 200. Among them, potassium hexatitanate fiber is most preferable for use in preparing a tool for preparing a semi-conductor (wafer basket) which requires a very high resistance to chemicals.

In the invention, the average fiber diameter and average fiber length of potassium titanate fiber are each the average of values which were measured in at least 5 observations with at least 10 fibers in each observation, with use of a scanning-type electron microscope. The aspect ratio is the average fiber length divided by the average fiber diameter.

Outside of the above ranges of average fiber diameter, average fiber length and aspect ratio, for example, at more than 1 μm in average fiber diameter, less than 5 μm in average fiber length, namely when the aspect ratio is below 5 (less than 10), the reinforcing effect is small, hence undesirable.

Further, fibers having an extremely small length of below 0.1 μm or having a long length of more than 100 μm are difficult to prepare industrially and have little practical use.

In general, potassium titanate fiber is added in an amount of 5 to 40% of the total of the amounts of the fluorine-containing resin and the potassium titanate fiber. In case of TFE-hexafluoropropylene copolymer and TFE-perfluoroalkyl vinyl ether copolymer which are high in melt viscosity, potassium titanate fiber is added in preferably 5 to 30%, more preferably 10 to 30%. With less than 5%, the reinforcing effect is low. While, with more than 40%, the properties are not improved in proportion to the amount of fiber and molding is difficult due to high melt viscosity, hence this is undesirable.

Although potassium titanate fiber can be used as it is, it is preferably surface-treated with a silane coupling agent, titanate coupling agent, epoxy resin, epoxy-urethane resin and the like to improve its wettability with the fluorine-containing resin.

The resin composition of the invention can be prepared by various methods, for example, 1. a method in which potassium titanate fiber is added to a system of polymerization of tetrafluoroethylene or like monomer, 2. a method in which potassium titanate fiber is added to the polymerization system in the middle of the polymerization, or to the take-out process of the polymer, 3. a method in which potassium titanate fiber is added to the fluorine-containing resin polymer, the mixture is extruded by use of an extruder, cooled and then cut to prepare pellets, etc.

The third method is most practically employed.

To the resin composition of the invention may be added an additive such as hydroxide and carbonate of Ca, Ba, Zn and Mg and like heat-stabilizer, terephthalic acid, kaolin, talc, kieselguhr and like crystal growth promoting nucleus, tripropargyl cyanurate and like crosslinking agent, carbon black and like coloring agent in a range not affecting the effects of the present invention.

The resin composition of the invention is melt-moldable and can be shaped by injection molding, extrusion, transfer molding and like methods having excellent productivity.

Although the resin composition of the invention has incorporated therein, as a reinforcing agent, potassium titanate fiber which is about 1/10 to 1/100 in size compared with conventional glass fiber or carbon fiber its mechanical property is extremely improved in the invention. Further, the resin composition can be molded into thin-wall parts by a simple method, and has an improved creep characteristics, thus having an excellent economical and practical values.

It was difficult hitherto to design a mold and to shape the fluorine-containing resin into minute parts due to the large molding shrinkage of the resin, but the shrinkage is lowered in the composition of the invention with the addition of potassium titanate fiber without affecting the moldability of the resin.

The resin composition can be molded into complicated or small, thin-wall parts, because the composition has an excellent dimensional accuracy due to a small anisotropy. The composition provides a molded product having a very good appearance due to the excellent surface-smoothness and gloss compared with those resins reinforced with glass fiber or carbon fiber and the like. The invention also gives a molded product reinforced with potassium titanate fiber which hardly injures another article in combination, because of the low Mohs hardness of the fiber of 4.

The resin composition of the invention has the above excellent characteristics which are not obtained in resins reinforced with glass fiber or carbon fiber.

The resin composition of the invention has a wide use for injection molded articles such as a pump, valve, packing, tool for preparing semi-conductor, extrusion articles such as a tube, round rod, coated electric wire, transfer molded articles such as a large valve, large pump, blow molded thin-wall articles such as a bottle, container. The composition is also applied to a corrosion resistant lining or coating of a reactor or piping, adhesive, etc.

The invention will be described in more detail with reference to Examples but it is not intended that the invention be restricted by or to the examples.

EXAMPLES 1 to 3 AND COMPARISON EXAMPLE 1

To pellets of ethylene-tetrafluoroethylene copolymer (Neoflon ETFE EP-520, a product of Daikin Industries Ltd.) was added potassium titanate fiber treated with epoxy-silane (Tismo-D102, average fiber diameter 0.3 $\mu$m, average fiber length 15 $\mu$m, a product of Otsuka Kagaku KK) in an amount of 5 to 40% based on the composition as listed in Table 1. The mixture was weighed, mixed uniformly and then melted in an extruder (45mm, single axis) at a temperature of 300° C. The molten mixture was cooled with water and made into pellets. The pellets were injection molded at an injection temperature of 300° C., mold temperature of 120° C. and injection pressure of 800 kg/cm$^2$ to prepare a test specimen. A test specimen for comparison was prepared in the same manner as above with use of pellets obtained without use of potassium titanate fiber. The following properties were measured with use of the specimens and the results were given in Table 1.

Tensile strength

Measured according to ASTM D638 with use of Type I specimens (3.2 mm thick). Distance between grips: 100 mm, Speed of testing: 10 mm/min.

Bending strength and bending modulus

Measured according to ASTM D790 with use of a Test specimens, 150 mm long, 13 mm wide and 6.4 mm height. Crosshead rate: 5 mm/min., support span: 100 mm.

Molding shrinkage

Shrinkage in longitudinal direction was measured with a micrometer by use of specimens for the tensile test (200 mm long by 3.2 mm thick)

Heat distortion temperature, HDT

Measured according to ASTM D648 with use of a Test specimens, 150 mm long by 6.4 mm wide by 13 mm height. Bending stress: 18.6 kgf/cm$^2$, temperature elevation: 2° C./min.

TABLE 1

| | Example | | | Com. Ex. |
|---|---|---|---|---|
| | 1 | 2 | 3 | 1 |
| Content of fiber (%) | 5 | 20 | 40 | 0 |
| Tensile strength (kgf/cm$^2$) | 480 | 680 | 830 | 380 |
| Bending strength (kgf/cm$^2$) | 420 | 830 | 1,170 | 320 |
| Bending modulus (kgf/cm$^2$) | 17,200 | 48,600 | 72,500 | 8,600 |
| Shrinkage (%) | 1.10 | 0.52 | 0.26 | 1.52 |
| HDT (°C.) | 95 | 121 | 140 | 82 |

As apparent from Table 1, the effect of potassium titanate fiber is small when used in an amount of less than 5%, as compared to the results of the addition of 5 to 40%. It is very difficult to prepare pellets by extrusion with the addition more than 40%, hence this value is impractical.

EXAMPLES 4 TO 7 AND COMPARISON EXAMPLES 2 TO 4

Three kinds of pellets were prepared in the same manner as in Example 1 with the exception of using poly(chlorotrifluoroethylene) (Daiflon CTFE M-300P, a product of Daikin Industries Ltd.), TFE-hexafluoropropylene copolymer (Neoflon FEP NP-30, a product of Daikin Industries Ltd.) and TFE-perfluoroalkyl vinyl ether copolymer (Teflon PFA 340J, a product of Mitsui Fluorochemical Co., Ltd.) in amounts listed in Table 2. A pellet was prepared for comparison without use of potassium titanate fiber. The injection molding was conducted in the same conditions as in Example 1 except that poly(chlorotrifluoroethylene) was injected at 260° C. and each of TFE-hexafluoropropylene copolymer and TFE-perfluoroalkyl vinyl ether copolymer was injected at 360° to 380° C. The results were shown in Table 2.

TABLE 2

|  | Example | | | | Com. Ex. | | |
| --- | --- | --- | --- | --- | --- | --- | --- |
|  | 4 | 5 | 6 | 7 | 2 | 3 | 4 |
| Daiflon CTFE (M-300 P) | 80 | — | — | — | 100 | — | — |
| Neoflon FEP (NP-30) | — | 90 | — | — | — | 100 | — |
| Teflon PFA (340 J) | — | — | 93 | 85 | — | — | 100 |
| Tismo D-102 | 20 | 10 | 7 | 15 | — | — | — |
| Tensile strength (kgf/cm$^2$) | 660 | 360 | 360 | 450 | 370 | 250 | 280 |
| Bending strength (kgf/cm$^2$) | 1,000 | 330 | 310 | 480 | 470 | 210 | 230 |
| Bending modulus (kgf/cm$^2$) | 59,000 | 14,600 | 11,200 | 25,100 | 17,000 | 6,300 | 6,700 |
| Shrinkage (%) | 0.60 | 1.60 | 2.98 | 1.43 | 1.75 | 3.40 | 3.79 |
| HDT (°C.) | — | — | 84 | 102 | — | — | 62 |

As apparent from Table 2, potassium titanate fiber exhibits an excellent reinforcing effect, lowers molding shrinkage and enhances dimensional accuracy in combination with poly(chlorotrifluoroethylene) as well as polytetrafluoroethylene copolymer such as TFE-hexafluoropropylene copolymer and TFE-perfluoroalkyl vinyl ether copolymer.

EXAMPLES 8 TO 12 AND COMPARISON EXAMPLE 5

To a powder of polyvinylidene fluoride (KF polymer #1000, a product of Kureha Chemical Industry Co., Ltd. ηinh=1.00) was added potassium titanate fiber treated with epoxy-silane (Tismo-D102, average fiber diameter 0.3 μm, average fiber length 15 μm, a product of Otsuka Kagaku KK) in an amount of 5 to 40% based on the composition as listed in Table 3. The mixture was weighed, mixed uniformly and then melted in an extruder (45 mm, single axis) at a temperature of 230° C. The molten mixture was cooled with water and made into pellets. The pellets were injection molded at an injection temperature of 220° C., mold temperature of 90° C. and injection pressure of 800 kg/cm$^2$ to prepare test specimen. A test specimen for comparison was prepared in the same manner as above with use of pellets obtained without use of potassium titanate fiber. The following properties were measured with use of the specimens and the results were given in Table 3.

Tensile strength

Measured according to JIS K7113 with use of Type I specimens (4 mm thick). Distance between grips: 100 mm, Speed of testing: 10 mm/min.

Bending strength and bending modulus

Measured according to JIS K7203 with use of a Test specimens, 185 mm long, 10 mm wide and 4 mm height. Crosshead rate: 5 mm/min., support span: 60 mm.

Molding shrinkage and surface smoothness

Shrinkage in longitudinal and latitudinal directions was measured with a micrometer by use of three side-gate samples 60 mm long by 50 mm wide by 3 mm height.

Surface smoothness was observed with the unaided eye.

TABLE 3

|  | Example | | | | | Com. Ex. |
| --- | --- | --- | --- | --- | --- | --- |
|  | 8 | 9 | 10 | 11 | 12 | 5 |
| Content of fiber (%) | 5 | 10 | 20 | 30 | 40 | 0 |
| Tensile strength (kgf/cm$^2$) | 700 | 850 | 1010 | 1110 | 1130 | 520 |
| Bending strength (kgf/cm$^2$) | 1160 | 1440 | 1700 | 1870 | 1930 | 800 |
| Bending modulus (kgf/cm$^2$) | 38000 | 58000 | 83000 | 93000 | 95000 | 21000 |
| HDT (°C.) | 137 | 152 | 163 | 167 | 169 | 80 |
| Shrinkage (%) | | | | | | |
| longitudinal | 1.6 | 1.1 | 0.8 | 0.5 | 0.3 | 3.3 |
| latitudinal | 1.7 | 1.2 | 0.9 | 0.6 | 0.4 | 3.3 |
| Surface smoothness | Good | Good | Good | Good | Good | Good |

As apparent from Table 3, it is clear that potassium titanate fiber is effective in an amount of 5 to 40%. It is difficult to improve properties to a great extent with the addition of more than 40%.

COMPARISON EXAMPLES 6 to 9

Four kinds of resin compositions were prepared in the same manner as in Examples 8 to 12 except that carbon fiber having an average fiber diameter of 12.5 μm and an average fiber length of 3 mm (Kureca chop C-103, a product of Kuhera Chemical Industry Co., Ltd.) was used in amounts of 5 to 30% as listed in Table 4 in place of potassium titanate fiber. Test specimens were also prepared in the same manner as in Examples 8 to 12 with use of the above compositions and the properties thereof were measured. The results were given in Table 4.

TABLE 4

|  | Com. Ex. | | | |
| --- | --- | --- | --- | --- |
|  | 6 | 7 | 8 | 9 |
| Content of carbon fiber (%) | 5 | 10 | 20 | 30 |
| Tensile strength (kgf/cm$^2$) | 610 | 710 | 810 | 850 |
| Bending strength (kgf/cm$^2$) | 1050 | 1160 | 1230 | 1310 |
| Bending modulus (kgf/cm$^2$) | 28000 | 37000 | 44000 | 47000 |

TABLE 4-continued

| | Com. Ex. | | | |
|---|---|---|---|---|
| | 6 | 7 | 8 | 9 |
| HDT (°C.) | 152 | 161 | 169 | 170 |
| Shrinkage (%) | | | | |
| longitudinal | 1.4 | 1.0 | 0.6 | 0.4 |
| latitudinal | 2.2 | 1.6 | 1.1 | 0.8 |

It is apparent from Tables 3 and 4 that the resin compositions of the invention exhibit a greater improvement in properties than those reinforced with carbon fiber. The composition of the invention is extremely low in anisotropy of molding shrinkage and thus the mold can be easily designed and the molded product has a small inner strain.

We claim:

1. A fluorine-containing resin composition which consists essentially of a potassium titanate fiber and at least one fluorine-containing resin selected from the group consisting of poly(chlorotrifluoroethylene), copolymer of tetrafluoroethylene and a copolymerizable monomer (a), chlorotrifluoroethylene-ethylene copolymer, tetrafluoroethylene-ethylene copolymer, polyvinylidene fluoride and copolymer of vinylidene fluoride and a copolymerizable monomer (b).

the copolymerizable monomer (a) being selected from to group consisting of
fluoro-olefin of the formula $$XCF_2(CF_2)mCF=CF_2 \quad (I),$$

fluorovinyl ether of the formula $$XCF_2(CF_2)nOCF=CF_2 \quad (II),$$

perfluoroalkyl vinyl ether of the formulae $$XCF_2(CF_2)_nOCFCF_2OCF=CF_2 \quad \text{and} \quad (III)$$
$$\overset{|}{CF_3}$$

$$Y-CF_2CF_2OCFCF_2OCF=CF_2 \quad (IV)$$
$$\overset{|}{CF_3}$$

perfluoroallyloxy compound of the formula $$CF_2=CCF_2O-\underset{E}{\overset{D}{\underset{|}{C}}}-G \quad (V)$$
$$\overset{|}{Z}$$

wherein X is F or H, m is 0 to 9, n is 0 to 7, Y is Cl, —SO$_2$F, —COF, —CO$_2$H, —CO$_2$R$^1$, —CF$_2$CO$_2$R$^1$, —(CF$_2$)xR$^1$, R$^1$ being F or CF$_3$, x is 1 to 6, Z is Cl or F, D is —CF$_2$R$^2$ or $$-\underset{CF_3}{\overset{|}{CFR^2}},$$

R$^2$ being F, Cl, —SO$_2$F, —COF, —CO$_2$H, —CO$_2$R$^1$, —CF$_2$CO$_2$R$^1$ or —(CF$_2$)xR$^1$, E is F, —CF$_3$, —CF$_2$CO$_2$R$^1$ or —CF$_2$Cl, G is F or —CF$_3$, the copolymerizable monomer (b) being selected from the group consisting of tetrafluoroethylene, hexafluoropropylene, chlorotrifluoroethylene and vinyl fluoride, the potassium titanate fiber being contained in an amount of 5 to 40% by weight based on the total amount of the fiber and the resin.

2. A composition as defined in claim 1 wherein the potassium titanate fiber has an average fiber diameter of 0.1 to 2 μm, average fiber length of 5 to 100 μm and a ratio of average fiber length to average fiber diameter (aspect ratio) of 10 to 200.

* * * * *